United States Patent
Cameron et al.

(10) Patent No.: US 11,275,787 B2
(45) Date of Patent: Mar. 15, 2022

(54) ENTITY VIEWPOINT DETERMINATIONS

(71) Applicant: EntIT Software LLC, Sunnyvale, CA (US)

(72) Inventors: Pashmina Cameron, Cambridge (GB); Sean Blanchflower, Cambridge (GB)

(73) Assignee: MICRO FOCUS LLC, Santa Clara, CA (US)

( * ) Notice: Subject to any disclaimer, the term of this patent is extended or adjusted under 35 U.S.C. 154(b) by 633 days.

(21) Appl. No.: 15/693,189

(22) Filed: Aug. 31, 2017

(65) Prior Publication Data
US 2019/0065626 A1 Feb. 28, 2019

(51) Int. Cl.
*G06F 16/903* (2019.01)
*G06Q 50/00* (2012.01)
*G06K 9/00* (2022.01)
*G10L 25/90* (2013.01)

(52) U.S. Cl.
CPC ...... *G06F 16/90335* (2019.01); *G06F 16/903* (2019.01); *G06K 9/00228* (2013.01); *G06K 9/00288* (2013.01); *G06Q 50/01* (2013.01); *G10L 25/90* (2013.01)

(58) Field of Classification Search
CPC ............ G06F 16/90335; G06F 16/903; G06K 9/00228; G06K 9/00288; G06Q 50/01; G10L 25/90
See application file for complete search history.

(56) References Cited

U.S. PATENT DOCUMENTS

| 9,483,582 | B2 | 11/2016 | Gaucher et al. |
| 2006/0198392 | A1* | 9/2006 | Park .................... H04N 21/2343 370/468 |
| 2012/0054292 | A1* | 3/2012 | Weda .................... G06Q 10/10 709/206 |
| 2013/0158984 | A1* | 6/2013 | Myslinski ............. G06F 16/951 704/9 |
| 2013/0159127 | A1* | 6/2013 | Myslinski ............. G06Q 30/02 705/26.1 |
| 2014/0089323 | A1* | 3/2014 | Wu ...................... G06F 16/9535 707/748 |
| 2014/0188993 | A1 | 7/2014 | Klein et al. |
| 2015/0066895 | A1 | 3/2015 | Komissarchik et al. |
| 2015/0296228 | A1* | 10/2015 | Chen ...................... G06F 16/78 725/34 |
| 2016/0239496 | A1* | 8/2016 | Motte ............... G06F 16/24578 |

(Continued)

FOREIGN PATENT DOCUMENTS

WO    WO-09089116    7/2009

OTHER PUBLICATIONS

Loredana, "Spam Detection Filter using KNN Algorithm and Resampling", 2010.*

(Continued)

*Primary Examiner* — Aleksandr Kerzhner
*Assistant Examiner* — Maher N Algibhah

(57) ABSTRACT

According to examples, an apparatus may identify a first viewpoint that an entity expressed in a first media file, identify a second viewpoint expressed in a second media file that is attributed to the entity, determine that the second viewpoint is dissimilar to the first viewpoint and in response to the determination that the second viewpoint is dissimilar to the first viewpoint, may output a message.

19 Claims, 5 Drawing Sheets

(56) References Cited

U.S. PATENT DOCUMENTS

2017/0083974 A1\* 3/2017 Guillen .................. G06Q 40/04

OTHER PUBLICATIONS

B.S. Detector, "A browser extension that alerts users to unreliable news sources", download date Jun. 17, 2017, pp. 2. http://bsdetector.tech/.
Hassan, N. et al., "The Quest to Automate Fact-checking", Jul. 2015, pp. 5. http://cj2015.brown.columbia.edu/papers/automate-fact-checking.pdf.
Niall J. Conroy, et al., "Automatic Deception Detection: Methods for Finding Fake News", Oct. 2015, Louis, MO, USA, pp. 9. https://www.researchgate.net/publication/281818865_Automatic_Deception_Detection_Methods_for_Finding_Fake_News.

\* cited by examiner

ENTITY VIEWPOINT DETERMINATIONS

BACKGROUND

Internet access has increased the availability and accessibility of media files, such as news articles, journals, videos, audio files, books, blogs, social media, and webpages. Such media files are generally accessible within a short period after publication and may be accessible to any number of multiple publishers as well as users. Also, such media files may be consumed on multiple devices such as smartphones, tablets, computers, and laptops. Unlike media files in reputed publications, some media files published or distributed on the Internet may not have been validated.

BRIEF DESCRIPTION OF THE DRAWINGS

Features of the present disclosure are illustrated by way of example and not limited to the following Figure(s), in which like numerals indicate like elements.

DETAILED DESCRIPTION

Figure 1:
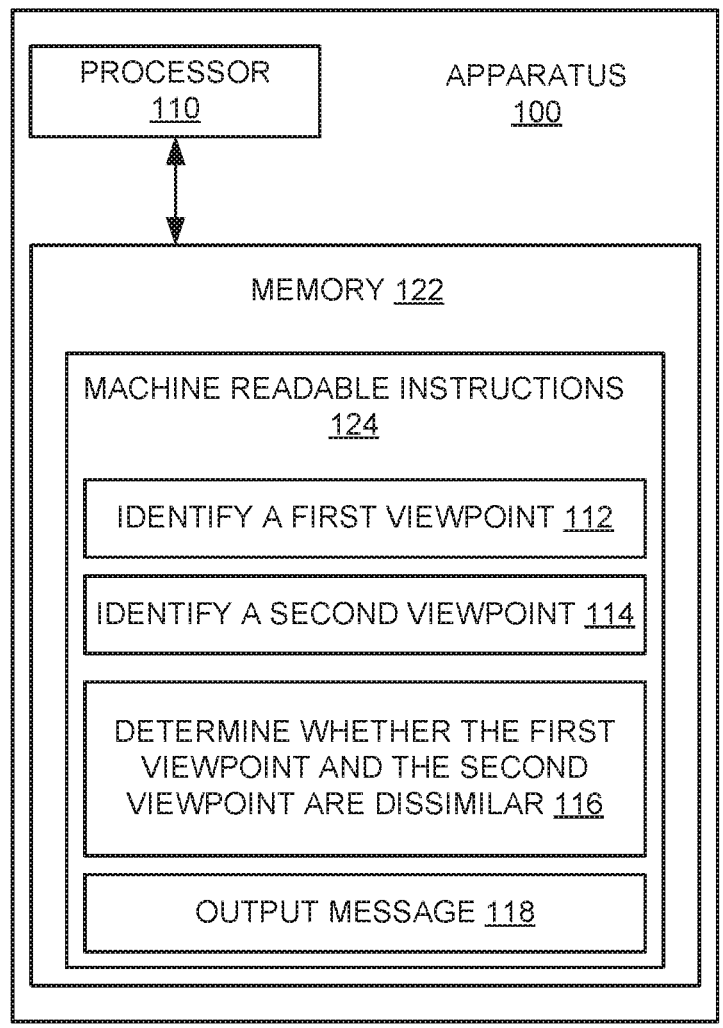
FIG. 1 illustrates a block diagram of an example apparatus for viewpoint detection.

For simplicity and illustrative purposes, the present disclosure is described by reference to an example. In the following description, numerous details are set forth in order to provide an understanding of the present disclosure. However, the present disclosure may be practiced without limitation to these details. As used herein, the terms "a" and "an" are intended to denote at least one of a particular element, the term "includes" means includes but not limited to, the term "including" means including but not limited to, and the term "based on" means based at least in part on.

As used herein, the terms, first, second, third, etc., are used to distinguish elements with respect to each other and are thus not intended to be construed as conveying a particular order of operations.

Examples disclosed herein may include identifying a first viewpoint that an entity expressed in a first media file and identifying a second viewpoint expressed in a second media file that is attributed to the entity. The examples disclosed herein may also include determining whether the second viewpoint is dissimilar to the first viewpoint and in response to a determination that the second viewpoint is dissimilar to the first viewpoint, outputting a message. A viewpoint may be an opinion expressed by or attributed to the entity and may be expressed in a media file. A viewpoint may be expressed in a media file or may be determined by association. For example, the media file may list the top fifty entities who completed the Boston marathon. Being present in the top one hundred entities who completed the Boston marathon may be associated with certain views about health, exercise and the like.

The examples disclosed herein may also include identifying a subset of media files stored in a data repository expressed by the entity and may include identifying a plurality of features in each of the media files in the identified subset of media files. In examples, the features may be phrases, clauses, or a group of words in a media file. A set of topic classes associated with the identified plurality of features may be determined. By way of particular example, the topic classes may be global warming, social security, tax reform, or the like. The viewpoint an entity expressed in a first media file that belongs to the subset of media file and belongs to a topic class in the set of topic classes may be identified. In addition, a viewpoint expressed in a second media file pertaining to the topic class that is dissimilar to the identified viewpoint may be identified. Moreover, a message, such as a notification, may be outputted in response to the identified dissimilar viewpoint being expressed in the second media file.

According to examples, an index may be generated that associates the entity with a viewpoint, the viewpoint with the media file in which the viewpoint is expressed, and the viewpoint with a topic class in the set of topic classes. The index may facilitate searches based on viewpoints to identify entities that have expressed a similar viewpoint or a dissimilar viewpoint, identify a media file in which a similar viewpoint, or a dissimilar viewpoint is expressed, or the like. Similarly, the index may facilitate searches based on an entity to identify the viewpoints expressed by the entity, and changes in viewpoints that the entity expressed.

According to examples, a viewpoint attributed to an entity in a first media file may be validated based on viewpoints that the entity expressed in a second media file. In examples, the second media file may reference the first media file. For example, a news article may attribute a viewpoint to an entity and link to a video of an incident corresponding to the news article. The viewpoint expressed in the first media file attributed to an entity may be identified, the viewpoint expressed by the entity in the second media file may be identified, and the viewpoint may be validated based on a comparison between the first media file and the second media file. For example, the first media file may be a published article with a quote attributed to a person and the second media file may be a video including the quote and the first media file may cross-reference the video explicitly or implicitly.

According to examples, a media file may be authenticated based on a variation in a feature of the media file. Examples of features of the media file may include the codec of a video file, the pitch of a voice in a video or audio file, a longer than average pause in a video or audio file, a change in style in a written media file, and the like. A determination may be made that the viewpoint is untrustworthy in response to the variation in the value of the feature exceeding a certain threshold. For example, the a determination may be made that a video file is untrustworthy in response to a variation in a feature of the media file, such as a variation in a codec used in a video. The video codec may change when the video is stitched together from different videos. Similarly, a determination may be made that a video file or an audio file is untrustworthy in response to a variation in the value of a biometric feature such as the pitch of a voice in a video file or audio file exceeding a certain threshold as may occur when the video file or audio file is altered. In response to a determination that the media file is untrustworthy, the viewpoint associated with the entity may be invalidated and a user of the potentially doctored media file may be notified.

According to examples, a chronological sequence of viewpoints for the entity may be generated. For instance, a chronological feature, such as time of creation of the media file, time of editing, time of publication, time of compression as evidenced from the meta-data associated with the files in the media file and the like for a media file stored in the data repository may be identified. In addition, the chronological feature may be used to create the chronological sequence of viewpoints for the entity.

According to examples, an entity, such as an individual, may be identified based on the biometric features of the entity associated with a media file. For example, a plurality of facial features present in the media file may be identified. In addition, a plurality of reference facial features that are similar to each other may be identified. A subset of media files with the reference facial features that are similar to each other stored in the data repository may be identified. In examples, the reference facial features may be stored in the data repository. For example, a plurality of reference facial features for the entity may be determined and stored in the data repository.

A determination may be made as to whether the plurality of reference facial features for the entity are similar to a plurality of facial features in the first media file to identify the entity associated with the first media file. In other examples, a plurality of reference acoustic features may be identified and stored in the data repository. In addition, a determination may be made as to whether a plurality of acoustic features for the entity are similar to a plurality of acoustic features in the first media file to identify the entity associated with the first media file.

As used herein, a media file may be any file containing a phrase, such as a news article, a newsletter, a webpage, a portable document file document, a word document, and the like. Examples of media files may also include audio files, video files, text files, and the like. An entity may be an individual, an organization, a corporation, a group of individuals, or the like. A feature may be a measurable property or characteristic of interest in a media file. For instance, a feature may be a biometric feature of an individual, a semantic feature of an individual, or other distinguishing characteristic of an individual. A feature may also be a measurable property or characteristic of interest in a media file. For instance, in examples in which the media file is a text file, a feature of the text file may be a phrase, a clause or a group of words present in the text file.

In other examples in which the media file is an audio file, an image file or a video file, a feature may be a measurable property or characteristic of a part of the audio file, the image file or the video file. For example, in an image file, the apparatus 100 may identify the metadata, such as date of creation, compression, and the like, as a measurable property or characteristic. In other examples in which the media file is a video file or an audio file, the apparatus 100 may identify the codec of the video file or audio file as a discriminating and independent feature for doctored media file detection. In other examples, for supervised machine learning, the apparatus 100 may be provided the discriminating and independent feature. Machine learning methods may be implemented to identify a feature in a media file based on supervised or unsupervised learning. For example, the phrase "climate change is bogus," may be a feature in a media file, such as a news article. In examples, the phrase "climate change is bogus" may be extracted using machine learning methods, such as segmentation.

A topic class may classify the features in media files stored in the data repository based on the topics expressed in the plurality of features. For example, the media files stored in the data repository may contain a plurality of features that relate to climate change. The topic classes for the plurality of features in the data repository may be determined based on the k-nearest neighbors machine learning algorithm. In other examples, the topic classes for the plurality of features in the data repository may be identified based on a trained support vector machines machine learning model. For instance, the apparatuses and methods disclosed herein may include and/or use a support vector machines model trained using a training set to identify the topic classes.

Two viewpoints may be analogous or similar to each other when the features expressing the viewpoints are synonymous with respect to each other. Two viewpoints may be dissimilar from each other when the features expressing the viewpoints are antonyms of each other. In other examples, two viewpoints may be analogous or similar to each other when the features expressing the viewpoints are close to each other in the k-dimensional vector space. Likewise, the two viewpoints may be dissimilar from each other when the features expressing the viewpoints are distant from each other in the k-dimensional vector space. For example, the similarity or dissimilarity of viewpoints may be determined using a similarity threshold, which may allow variations in the viewpoint as being dissimilar to be detected, or may allow contradictions in viewpoints as being dissimilar to be detected.

A first viewpoint may be analogous or similar to a second viewpoint if the features in the second viewpoint are identical to the features in the first viewpoint. The a determination as to whether the first and second viewpoints are similar or analogous to each other may be made using an n-dimensional vector model of the features to identify nearest neighbors in the n-dimensional vector space. For example, the apparatuses and methods disclosed herein may use machine learning dictionaries such as word2vec or doc2vec to generate a feature vector and may use the feature vector to locate similar feature vectors to identify analogous or similar viewpoints. Similarly, dissimilar viewpoints may be determined based on the distance to antonymous features and the neighbors of the anonymous features in n-dimensional vector space. The level of similarity between viewpoints may be determined based on certain thresholds. For example, the term "dissimilar" may mean contradictory viewpoints or slight variations in viewpoints. In an example, the first viewpoint may be dissimilar to the second viewpoint when the entity expresses variations in viewpoints. For example, the entity may express a first viewpoint that "climate change is not real" and may express a second viewpoint that "climate change is not real, given the current evidence." Although the first viewpoint and the second viewpoint are not contradictory to each other in this example, they express two different viewpoints. As such, the apparatuses and methods disclosed herein may determine these viewpoints as being dissimilar with respect to each other. The apparatus may use the vector distance between these viewpoints to determine the viewpoints are dissimilar. In an example, the apparatus may use the similarity threshold to determine whether the viewpoints are similar.

A reference feature may be a feature that identifies an entity to a certain degree of confidence. For example, a set of facial features may identify an entity 90% of the time. The set of facial features that identify the entity in the media file stored in a data repository may be identified using machine learning. Similarly, a set of acoustic features that identify the entity in the media file stored in a data repository may be identified using machine learning. In examples, the k-d tree machine learning method may be used to classify the facial features in the media files stored in the data repository and associate the facial features with entities. In examples, the apparatuses and methods disclosed herein may use a machine learning model that associates facial features, audio features, and textual features in the same k-dimensional vector space.

The Internet has increased the availability and accessibility to a variety of media files. Often, media files are available from diverse sources. One potential drawback of this, however, is that media files from diverse sources increases the likelihood that such media files may be doctored and that the doctored media files may be circulated as being factual. Also, the media files may attribute viewpoints to entities that have never expressed those viewpoints. As such, the multiplicity of easily accessible media files on the Internet may create a technical problem in computer networks and devices connected to the computer network and document processing. For instance, media files having misattributed viewpoints, e.g., media files expressing viewpoints that are not properly attributed to an entity, is often circulated on computer networks, which may increase network utilization, increase utilization of bandwidth on the network, and may be computationally intensive on servers.

Viewpoint detection of entities as discussed herein may reduce network congestion and may reduce bandwidth usage associated with media files that feature viewpoints associated with entities that the apparatuses disclosed herein have identified as being untrustworthy. Also, use of the index of viewpoints in the identification of viewpoints, entities or media files may be computationally less intensive compared with viewpoint identification based on an exhaustive search of published articles, video, audio, or the like. Also, the use of the index of viewpoints as discussed herein may result in a more accurate identification of the entities that expressed a viewpoint, media files associated with the viewpoint or viewpoints of entities, media files associated with viewpoints expressed in media files, etc. The visualizations relating to viewpoints described herein may also involve a specific implementation of computer technology.

In addition, the apparatuses and methods disclosed herein may identify viewpoints and attribution of viewpoints to entities in media files and may flag media files with false attributions. The identification of false attributions and invalidation of the attributions may prevent or reduce the circulation of the viewpoints on the networks by notifying users of the false attributions. That is, entities may remove media files that express false attributions from circulation, which may reduce network utilization, decrease utilization of bandwidth on the network, and may reduce computational resource utilization on servers.

With reference to FIG. 1, there is shown a block diagram of an example apparatus 100 for viewpoint detection, e.g., for determining whether a viewpoint expressed in a second media file is dissimilar to a viewpoint expressed in a first media file. The apparatus 100, which may be a computing device, a server computer, or the like, may also validate the attribution of a viewpoint expressed in a media file to an entity.

Figure 2:
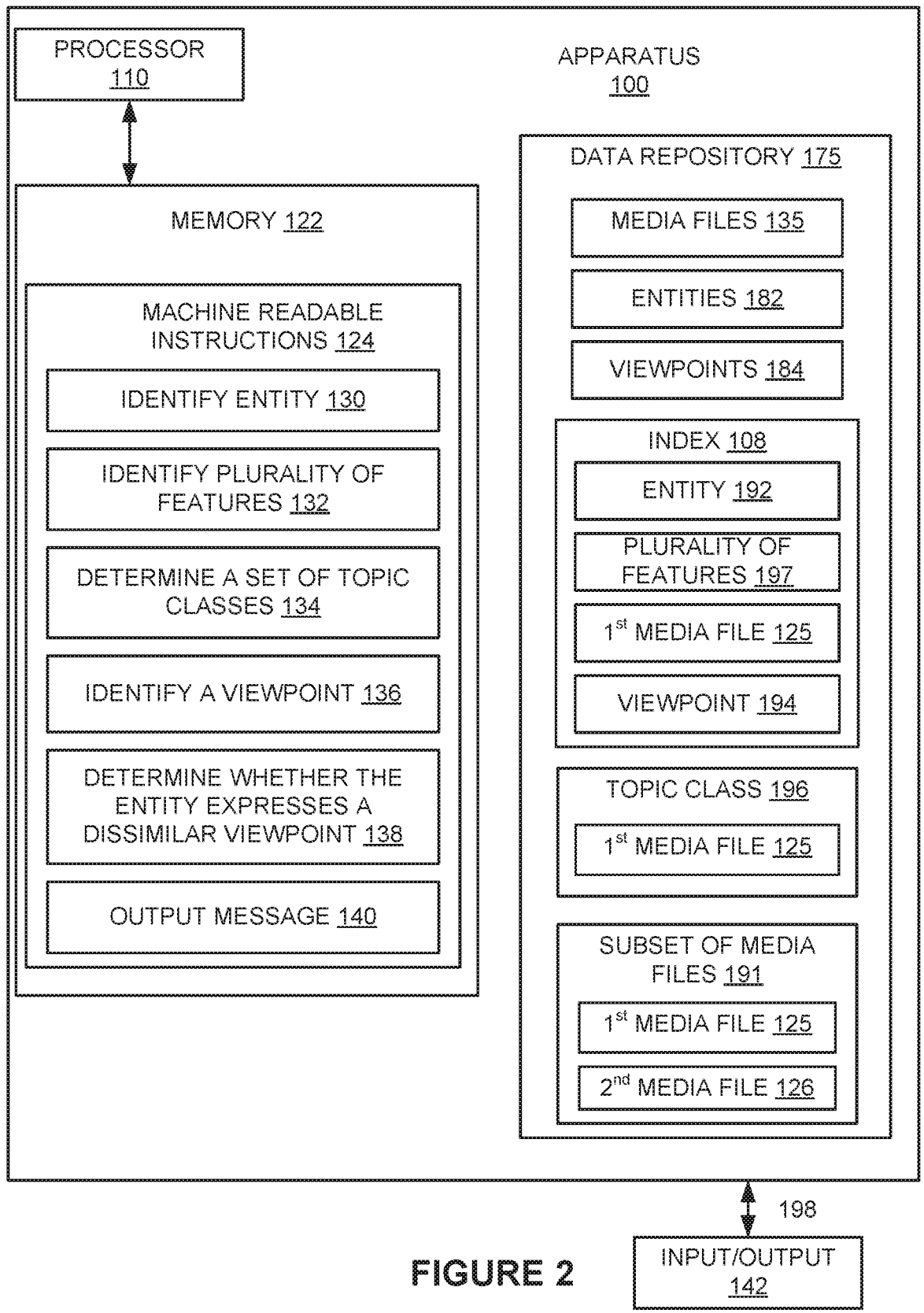
FIG. 2 illustrates an example apparatus for generating an index of viewpoints.

Generally speaking, and as discussed in greater detail herein with respect to FIG. 2, the apparatus 100 may identify an entity associated with a subset of media files 191 stored in a data repository 175 using facial recognition, acoustic recognition, or the like. The apparatus 100 may identify a plurality of features in each of the media files stored in the data repository 175. In examples, the features may be textual features, image features, and/or auditory features based on the contents of the media files. By way of example in which the media file is a textual file, the apparatus 100 may determine the textual features, such as phrases, using machine learning. In this example, the apparatus 100 may use, for instance, doc2vec and word2vec dictionaries to determine feature vectors based on the identified features.

The apparatus 100 may determine a set of topic classes in the media files stored in the data repository 175 based on the identified plurality of features. For example, the apparatus 100 may use a machine learning method, such as a trained neural network, to identify the topics expressed in the media files stored in the data repository 175 as a whole. The apparatus 100 may identify the viewpoint expressed by the entity in a first media file 125 in the subset of media files 191 that belongs to a topic class in the set of topic classes 196 to associate a viewpoint with the entity 192. The apparatus 100 may determine that the viewpoint expressed in a second media file 127 that is attributed to the entity in the subset of media files 191 is dissimilar to the identified viewpoint expressed in the first media file 125. The apparatus 100 may output a message such as a notification, in response to a determination that the viewpoints are dissimilar to each other.

The apparatus 100 may include additional components and one or more of the components described herein may be removed and/or modified without departing from a scope of the apparatus 100. For instance, the components of the apparatus 100 are shown as being on a single computing device or server as an example, and in other examples, the components may be provided on multiple computers or servers. In addition, or in other examples, the apparatus 100 may include multiple processors, a multiple core processor, a plurality of multiple core processors, or the like. The apparatus 100 may also include multiple memories. As such, the apparatus 100 is described as including a single processor 110 and a single memory 122 for purposes of simplicity.

The apparatus 100 may include a processor 110 and a memory 122 that stores machine readable instructions 124 that the processor 110 may execute. The processor 110, which may be a microprocessor, a micro-controller, an application specific integrated circuit (ASIC), a graphical processing unit, or the like, may perform various processing functions in the apparatus 100. The processing functions that the processor 110 performs, and other functions, operations and methods described herein may be embodied in the machine readable instructions 124. In addition to storing the machine readable instructions 124, the memory 122 may store data or functions, such as an entity 192 to identify the entity and a viewpoint 194 to identify a viewpoint of the entity (shown in FIG. 2).

As shown in FIG. 1, the machine readable instructions 124 may store instructions 112 to identify a first viewpoint that an entity expressed in a first media file. In examples, the first viewpoint that the entity expressed may be an attribution or in other examples, the first viewpoint may be opinions that the entity expressed directly. For example, the viewpoints of a politician on climate change may be expressed in a press release from the politician's office, based on support to a legislation or membership in an organization whose primary mission statement is to stop climate change. In an example, the entity expressing the viewpoint may be an organization, such as Green Peace.

The apparatus 100 may identify features in the media files stored in the data repository 175. The apparatus 100 may determine the first viewpoint the entity expressed in the first media file based on the identified features. Examples of features may include (1) biometric features such as facial features, acoustic features, speech patterns, etc., (2) semantic signatures such as word patterns, spelling errors, grammatical constructions in written media file, or the like. The apparatus 100 may determine entities expressing the viewpoints in the media files based on the features in the media files. That is, the apparatus 100 may identify a plurality of features in each of the media files stored in the data repository 175. For example, the plurality of features may be textual features, such as phrases.

The apparatus 100 may use models such as word2vec, doc2vec to determine feature vectors for the identified features in the media files. In the case of word2vec and doc2vec, the feature vectors may be representations of textual features in the k-dimensional vector space. The apparatus 100 may determine topic classes of the media files based on the plurality of features of the media files. For example, the apparatus 100 may use a trained convolutional neural network (CNN) to identify a subset of the identified plurality of features that are close to each other in the k-dimensional vector space to identify a topic expressed in the media files stored in the data repository 175. The apparatus 100 may identify the topics expressed in the media files based on this approach.

The apparatus 100 may identify the viewpoint expressed in the first media file 125 stored in the data repository 175 based on the topic class of the plurality of features in the first media file 125. In examples, the apparatus 100 may identify a media file containing the semantic features that express positive semantic features on a topic. For example, the apparatus 100 may identify a media file that expresses positive sematic features on climate change. The apparatus 100 may then determine the entity or entities that expressed the positive sematic features on the topic based on the proximity of the media file to other media files expressing positive sematic features on climate change in the k-dimensional vector space. The apparatus 100 may also identify negative semantic features that are at a distance from the positive semantic features in the k-dimensional vector space, using, for instance, word2vec antonyms. Thus, the apparatus 100 may identify media files that express dissimilar viewpoints or viewpoints that are contradictory to the viewpoint that the entity expressed in the first media file 125. For instance, the distance between the feature vectors indicates the dissimilarity. The apparatus 100 may also use a similarity threshold to identify closely related viewpoints that are dissimilar. For example, the apparatus 100 may differentiate between a viewpoint opposing climate change and a viewpoint opposing climate change due to lack of evidence. The two viewpoints opposing climate change may be at different locations in the k-dimensional vector space but may be closer than viewpoints that express support for climate change. The apparatus 100 may use the similarity threshold to identify dissimilar or similar viewpoints and may also display these viewpoints.

The machine readable instructions 124 may store instructions 114 to identify a second viewpoint expressed in a second media file that is attributed to the entity. In one regard, attribution of the viewpoint to the entity may be interpreted as meaning that the entity may or may not have expressed the viewpoint. The apparatus 100 may determine the second viewpoint expressed in the second media file by identifying a plurality of features, corresponding feature vectors and the topic classes in the second media file as discussed above with respect to the first viewpoint. For example, the apparatus 100 may use the support vector machine model to identify the topic classes in the second media file. The apparatus 100 may also determine the second viewpoint based on the feature vectors in the topic class and the location of the viewpoint in k-dimensional space. For example, viewpoints that express concern about climate change may be clustered together in the k-dimensional vector space.

The machine readable instructions 124 may include instructions 116 to determine whether the first viewpoint is dissimilar to the second viewpoint. The apparatus 100 may determine whether the first viewpoint is dissimilar to the second viewpoint based on the k-dimensional vector space of features. In an example, the viewpoints that express a lack of belief in climate change may be close to each other in the k-dimensional vector space but related to the feature vectors at a distance from the features that express concern about climate change.

The machine readable instructions 124 may include instructions 118 to output a message. In examples, the apparatus 100 may output a message or notification in response to a determination that the second viewpoint expressed in the second media file is dissimilar to the first viewpoint expressed in the first media file.

Turning now to FIG. 2, there is shown a block diagram of another example apparatus 100 for generating an index of viewpoints. The example apparatus 100 depicted in FIG. 2 may include additional components and that one or more of the components described herein may be removed and/or modified. As shown in FIG. 2, the apparatus 100 may include the processor 110, the memory 122, and the machine readable instructions 124 discussed with respect to FIG. 1. The memory 122 may also be used to store an index 108 generated by the apparatus 100.

The processor 110 may execute the machine readable instructions 124 to generate an index 108 that associates an identified entity with an identified viewpoint, the identified viewpoint with a media file 125, and the identified viewpoint with a topic class 196. The processor 110 may execute the machine readable instructions 124 as described with reference to FIG. 1 to identify the entities 182, the plurality of features in each of the media files 135 stored in the data repository 175 and the set of topic classes 186 of the media files 135. Further examples are provided below with reference to FIG. 2 to describe the example apparatus 100. As shown in FIG. 2, the apparatus 100 may store media files 135 that may be retrieved from a network 198 in the data repository 175. The apparatus 100 may be a server connected to other devices via the network 198. The network 198 may be a wide area network (WAN), Local area network (LAN), or the like. The apparatus 100 may include the processor 110 and the memory 122 and the processor 110 may execute the machine readable instructions 124 to perform instructions. In examples, the media files 135 may be documents, audio, video files, etc.

The processor 110 may execute the instructions 130 to identify the entity 192 from a plurality of entities 182 as described above with reference to FIG. 1. The processor 110 may store details of the plurality of entities 182 identified in the media files 135 stored in the data repository 175. In examples, the processor 110 may store details of the entities 182, including the entity 192. In examples, the processor 110 may determine a subset of media files 191 of the media files 135 where the viewpoints of the entity 192 have been identified as having been expressed. In examples, the apparatus 100 may identify the entity 192 based on entity names used in the media file 125, attribution of a viewpoint expressed in a news article, or the like. The apparatus 100 may identify the entity 192 based on facial recognition, audio recognition, codec recognition, or the like, as discussed herein. The apparatus 100 may also identify the entity 192 based on the semantic signature such as the structure of words, spelling errors, or the like. In examples, the apparatus 100 may access an external database of information such as an encyclopedia, database of entities, or the like, to identify the entity 192.

The processor 110 may execute the instructions 132 to identify a plurality of features 197 corresponding to the media files 135 stored in the data repository 175. As discussed herein, the plurality of features 197 may pertain to features of entities 182 associated with, e.g., authoring, appearing in, voiced in, etc., the media files 135. The processor 110 may execute the instructions 134 to identify a set of topic classes 186 for the media files 135. For example, the processor 110 may execute the instructions 134 to identify the topic class 196 housing the media file 125. The processor 110 may execute the instructions 136 to identify a viewpoint 194 expressed by the entity 192 in the media file 125. In addition, the processor 110 may similarly identify the viewpoints 184 expressed in the media files 135 by the entities 182.

The processor 110 may execute the instructions 138 to identify the viewpoint that the entity 192 expressed in each media file 125, 126 in the subset of media files 191. The processor 110 may execute the instructions 166 to generate an index 108, for instance, using the media file 125, the identified entity 192, and the identified viewpoint 194. The processor 110 may also include the topic class 196 in the index 108. The topic class 196 may contain a subset of the media files 191, such as media files 125, 126. Thus, the processor 110 may associate the identified entity 192 with the identified viewpoint 194, and the identified viewpoint 194 with the media file 125 in which the identified viewpoint 194 is expressed. Also, the processor 110 may associate the media file 125 with the identified topic class.

The apparatus 100 may receive a query via the input/output interface 142. The apparatus 100 may use the index 108 to identify a media file 125 in the data repository 175 based on the query. In an example, the apparatus 100 may receive a query for a viewpoint such as "Paris convention unfair" and may determine a media file 125 that expresses this viewpoint using information contained in the index 108. The apparatus 100 may also determine the entity 192 that expressed the viewpoint 194 in the media file 125 through a search of the index 108. The apparatus 100 may similarly identify all of the viewpoints 184 that the entity 192 expressed in the media files 135 stored in the data repository 175 using the information contained in the index 108.

The apparatus 100 may generate a chronological sequence of viewpoints of the entity 192 based on a time variable or a feature in the media file 125. The processor 110 may determine a time variable associated with each media file 125, 126 in the subset of media files 191 identified by the processor 110 for the entity 192. The processor 110 may output, e.g., to a display, the chronological sequence of viewpoints. By way of particular example, the apparatus 100 may output the chronological sequence of viewpoints for a presidential candidate in an election. In addition, the apparatus 100 may output a change in viewpoints of the presidential candidate to draw attention to the pivots in viewpoints of the presidential candidate. In addition, the processor 110 may display the message with or next to a display of the second media file, in which the message is displayed with a chronological sequence of the viewpoints that the entity 192 expressed in media files 135 stored in the data repository 175 on a topic.

The apparatus 100 may determine a plurality of acoustic features of entities 182 associated with the media files 135. The apparatus 100 may determine, for each of the entities 182, a respective set of reference acoustic features based on the determined plurality of acoustic features of the entities 182. For example, the acoustic features of the entities 182 in the media files 135 may include the pitch of an entity's voice, intonation of the voice, the characteristic pauses that are associated with an entity, or the like. The apparatus 100 may determine the features using machine learning techniques such as a CNN, a recurrent neural network (RNN), or the like.

The apparatus 100 may determine a set of reference acoustic features for each of the entity 182 associated with the media files 135 based on the determined acoustic features. In examples, the apparatus 100 may use the k-d tree machine learning to determine the set of reference acoustic features for the entities 182 identified as being associated with the media files 135. The apparatus 100 may identify acoustic features of the entities 182 in the media files 135 using machine learning techniques such as a trained CNN that identifies acoustic features in media files 135. For example, a trained CNN may identify acoustic features based on a training data set that includes acoustic features and a set of entities. Once trained, the apparatus 100 may use the trained CNN to identify reference acoustic features and may associate the reference acoustic features with the entities 182 that expressed the acoustic features.

The apparatus 100 may identify a set of acoustic features in the first media file 125. The apparatus 100 may also determine whether the identified set of acoustic features in the first media file 125 is similar to a set of reference acoustic features associated with an entity 192. Thus, the apparatus 100 may identify the entity in the first media file 125 based on a comparison of the identified set of acoustic features and the reference acoustic features.

The apparatus 100 may determine a plurality of facial features of entities 182 associated with the media files 135. The apparatus 100 may determine, for each of the entities 182 associated with the media files 135, a respective set of reference facial features based upon the determined plurality of facial features of the entities 182. For example, the facial features of entities 182 in the media files 135 may include the shapes of attributes on faces, such as the nose, eyes, lips, cheek and the relative positions of the attributes on the faces that are associated with the entities 182. The apparatus 100 may determine the facial features using machine learning techniques such as CNN, RNN or the like.

The apparatus 100 may determine a set of reference facial features for each entity 182 associated with the media files 135 based on the determined facial features. The apparatus 100 may use the k-means or the k-d tree machine learning algorithms to determine the set of reference facial features for each of the entities 182. The apparatus 100 may identify facial features in the media files 135 using machine learning techniques such as a trained CNN that identify facial features in media files. For example, a trained CNN may identify facial features based on a training data set that includes facial features and a set of entities 182. Once trained, the apparatus 100 may use CNN to identify reference facial features and may associate the reference facial features with entities 182 that expressed the facial features.

The apparatus 100 may identify a set of facial features in the first media file 125. The apparatus 100 may also determine that the identified set of facial features in the first media file 125 is similar to a set of reference facial features associated with an entity 192. Thus, the apparatus 100 may identify the entity 192 associated with the first media file 125 based on a comparison of the identified set of facial features and the reference facial features.

The apparatus 100 may identify a third viewpoint expressed in a third media file, in which the third media file refers to the first media file 125. For example, a media file published on MSNBC may refer to a video that includes a recording of a politician expressing a viewpoint. The apparatus 100 may validate the MSNBC media file based on the viewpoint expressed in the video. That is, the apparatus 100 may determine whether the third viewpoint is similar to the first viewpoint. For instance, the apparatus 100 may validate the first viewpoint in response to a determination that the third viewpoint is similar to the first viewpoint. The apparatus 100 may use machine learning to identify the viewpoint expressed in the third media file. Similarly, given two media files, the apparatus 100 may validate viewpoints attributed to an entity 192. Examples of the two media files may include textual media files such as published articles, a video media file and a news reporting of events recorded in the video media file, an audio media file and a news reporting of events recorded in the audio media file, or the like.

The apparatus 100 may validate a viewpoint expressed in a first media file 125 based on the value of a feature of the first media file 125. In examples, the apparatus 100 may use machine learning algorithms to identify features and values of features of the first media file 125. Examples of features may include video codecs, audio codecs, the styles and rhetorical media file of a sentence in a written media file, or the like. The apparatus 100 may use the variation in values of the features to validate the first viewpoint, for instance, without using a second viewpoint.

The apparatus 100 may determine whether the value of the feature of the first media file 125 varies within the first media file 125. In response to a determination that the feature of the first media file varies within the first media file 125, the apparatus 100 may determine that the first media file 125 is altered and may invalidate an association between the viewpoint expressed in the first media file 125 and the identified entity 192. As the video codec in a video does not normally change, the apparatus 100 may make a determination that the viewpoint expressed in the media file 125 is invalid based on the change in video codec in the video. In another example, the apparatus 100 may determine whether a value of the feature of the first media file 125 varies within the first media file 125. For example, a pitch of the voice of the entity 192 may vary within the first media file 125. The apparatus 100 may determine the variation of the feature of the first media file 125 over time. For example, the apparatus 100 may determine a variation of the pitch of the voice of the entity 192 over time in the media file 125 and may determine whether the variation in the value of the feature is within a certain threshold. The apparatus 100 may use machine learning techniques to determine the normal variation in pitch of the voice for the entity 192 based on the media file 125. The apparatus 100 may also determine the certain threshold based on the normal variation in pitch of the voice and in response to a determination that the variation of the value of the feature exceeds a certain threshold, and may invalidate the association between a viewpoint expressed in the first media file 125 and the entity 192.

The apparatus 100 may determine whether a value of the feature of the first media file 125 is similar to the value of the feature of a second media file. For example, a media file 125 may be circulated on social media with the image and voice of the President of the United States. The first media file 125 may be doctored by stitching together video, audio or both from multiple sources. The apparatus 100 may identify the media file 125 as having been doctored based on the value of the feature, such as parts of the video or parts of the audio to parts of video or audio collected in the data repository 175. For example, video and audio content in a media file 125 including the President may be collected and stored in the data repository 175. The apparatus 100 may identify the doctored media file by identifying the background images, the color of clothing or similar features. In another example, the apparatus 100 may identify the doctored media file based on the value of the feature changing over the course of the video. For example, the color of the tie of the person changing. In another example, the apparatus 100 may identify the podium and the background where the President delivered a speech and may match the podium and the background to the background in the first media file 125 to determine whether the first media file 125 is untrustworthy.

The apparatus 100 may output the message on a mobile device in response to a determination the viewpoint expressed in a second media file is dissimilar to the viewpoint expressed in the first media file 125. For example, a user may be watching news coverage on a news network, and the apparatus 100 may output the message to a mobile device with a link to the first media file when the second media file expresses a viewpoint that is dissimilar to the first viewpoint expressed in the first media file. In another example, the apparatus 100 may output the message, e.g., output the message to a display, with the second media file that a user is viewing to allow the user to verify the dissimilar viewpoint.

The apparatus 100 may generate a cloud of viewpoints and may display the viewpoint cloud with, e.g., above or below, the media file that the user is currently viewing. In examples, the apparatus 100 may determine a viewpoint cloud based on machine learning methods such as recurrent neural networks. In examples, the apparatus 100 may display the viewpoint cloud in response to a determination that the viewpoint expressed in the second media file is dissimilar to the first media file 125. The viewpoint cloud may allow the user to identify the various viewpoints expressed by the entity and to navigate between media files expressing the viewpoints.

Figure 3A:
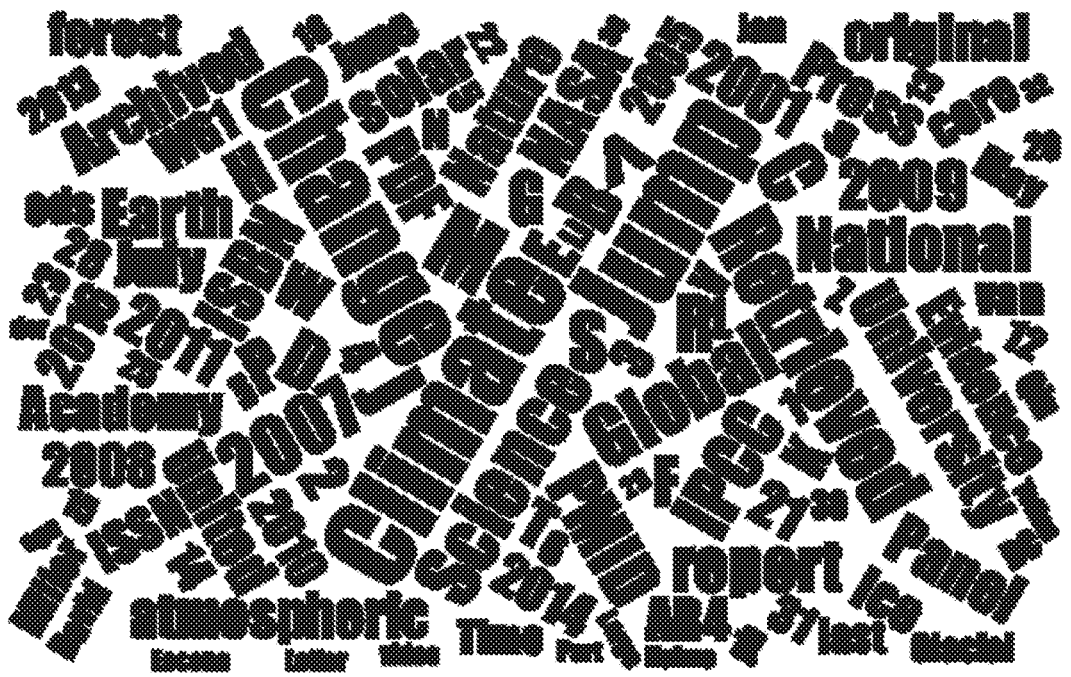
FIGS. 3A and 3B, respectively depict example topic clouds.
Figure 3B:
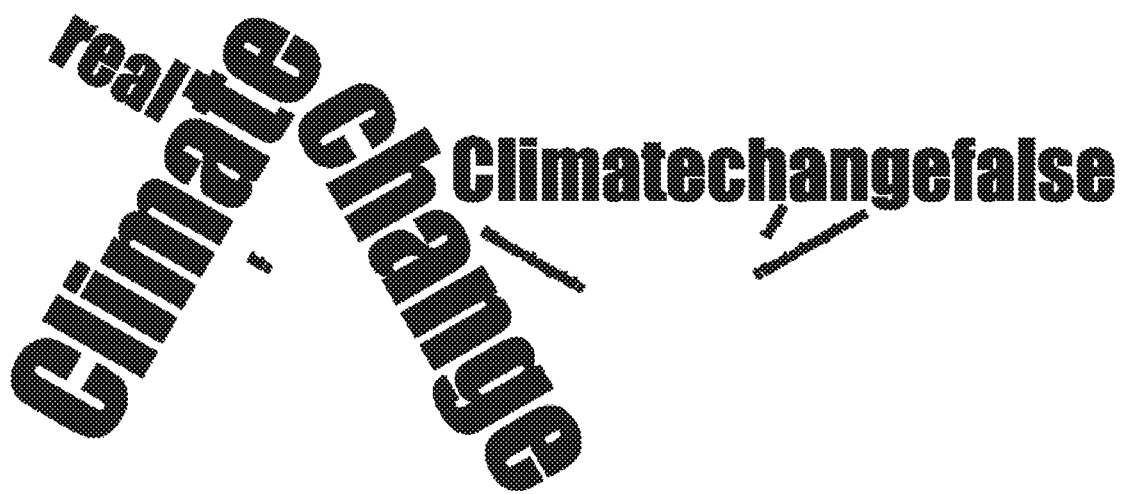

In examples, the apparatus 100 may alert the user when the first viewpoint is contradictory to the second viewpoint. For example, the apparatus 100 may generate a topic cloud of the topic classes as shown in FIG. 3A. The apparatus 100 may receive input from the user to expand the topic cloud shown in FIG. 3A to display a viewpoint cloud as shown in FIG. 3B. For example, the topic cloud in FIG. 3A shows the different topics in a data repository and may be expanded to display the viewpoint cloud for climate science. The apparatus 100 may generate the viewpoint cloud with the different viewpoints. In another example, the apparatus 100 may generate a viewpoint cloud to include viewpoints for and against a viewpoint. For example, FIG. 3B shows a viewpoint cloud with viewpoints for and against climate change. In an example, the apparatus 100 may generate a topic cloud that expands based on user input to display a viewpoint cloud. In an example, the apparatus 100 may generate a viewpoint cloud with entities supporting a viewpoint and entities opposing the viewpoint in the data repository 175. In an example, the apparatus 100 may generate a viewpoint cloud for an entity in the data repository 175.

Figure 4:
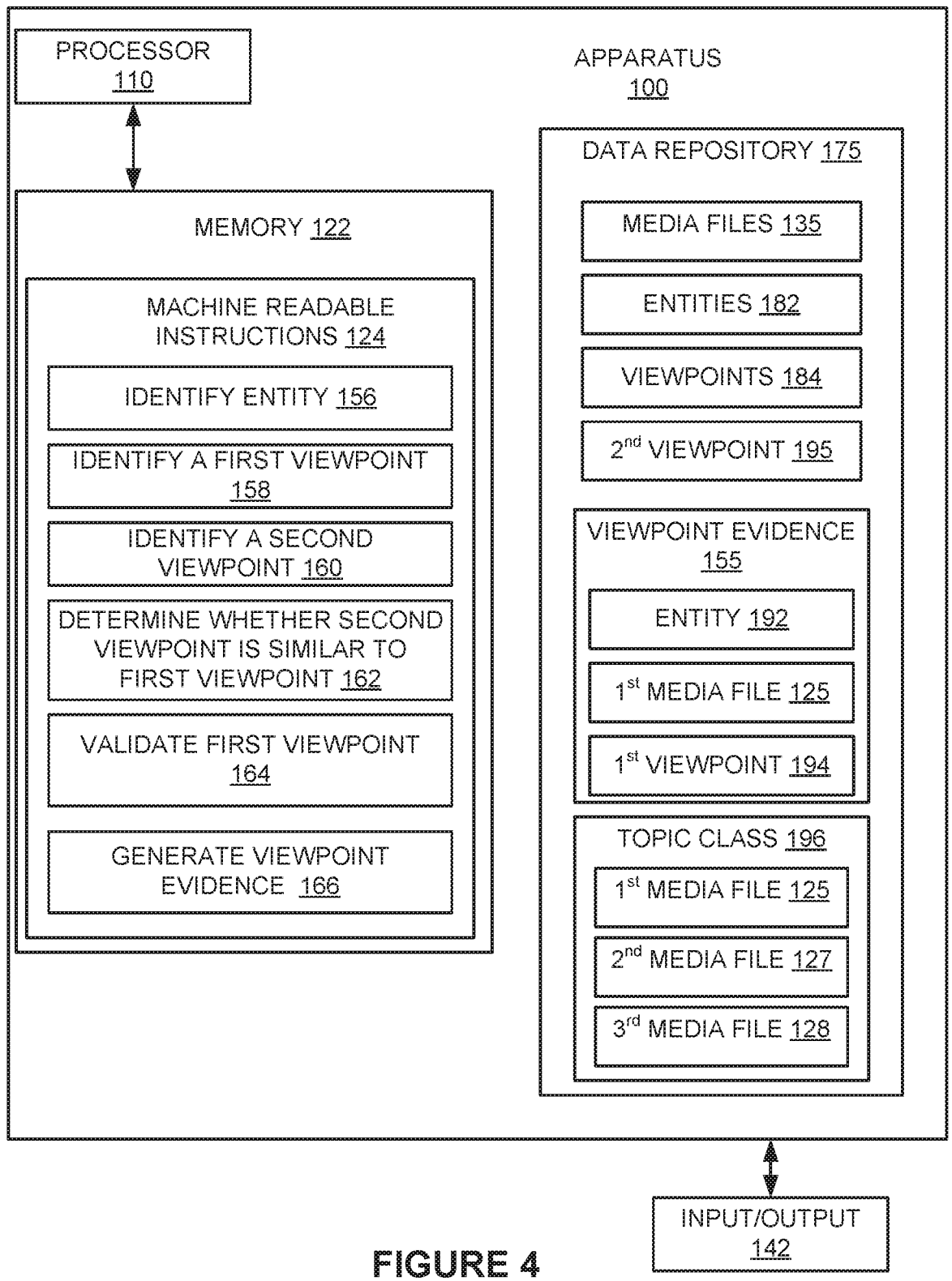
FIG. 4 illustrates another example apparatus for generating viewpoint evidence.

With reference now to FIG. 4, there is shown a block diagram of another example apparatus 100 for generating viewpoint evidence 155. The viewpoint evidence 155 may include information identifying an entity's viewpoint 194 and the media file 125 in which the entity 192 expressed the viewpoint 194. Generally speaking, the apparatus 100 depicted in FIG. 4 may generate the viewpoint evidence 155 for each viewpoint expressed by an entity 192 in the media files 135. The apparatus 100 may generate the viewpoint evidence 155 for the earliest published media file where the viewpoint is attributed to the entity 192.

In addition or in other examples, the apparatus 100 may generate the viewpoint evidence 155 when the entity 192 expresses a dissimilar viewpoint to the viewpoint expressed in an earlier published media file. The apparatus 100 may determine viewpoint evidence 155 timelines based on the times at which the viewpoints were expressed, based on cross-references from trusted sources, or the like. For example, the entity 192 may express a viewpoint in a closed meeting that remains unpublished. In this example, the entity 192 may subsequently have expressed a dissimilar viewpoint in other media files. The apparatus 100 may use attribution data from trusted sources to authenticate the time of creation of the later published media file to create an accurate chronological sequence of viewpoints for the entity 192.

The processor 110 may execute the machine readable instructions 124 to determine the identity 156 of an entity 192 associated with a media file 125 of the media files 135, which may be stored in the data repository 175. The processor 110 may use a k-means algorithm, convolutional neural network, or other machine learning methods to identify the entity as discussed above with reference to FIG. 1 and FIG. 2. The processor 110 may execute the instructions 158 to identify a first viewpoint that the entity expressed in a first media file 125 stored in the data repository 175. As discussed above with reference to FIG. 1, the processor 110 may identify a plurality of features 198, the media file 125, and the viewpoints 194 using machine learning methods.

The processor 110 may execute the instructions 160 to identify a second viewpoint 195 expressed in a second media file 127 stored in the data repository 175 that is attributed to the entity 192. The processor 110 may execute the instructions 162 to determine whether the second viewpoint 195 is similar to the first viewpoint 194. The processor 110 may, as discussed above with reference to FIG. 1 and FIG. 2, determine whether the first and second viewpoints 194 and 195 are similar to each other based on the k-dimensional vector mapping of the first viewpoint 194 and the second viewpoint 195. In an example, similar viewpoints may be considered to be close to each other in the k-dimensional vector space. The similarity and dissimilarity may be identified based on mathematical operations on the vectors representing the first viewpoint 194 and the second viewpoint 195.

The processor 110 may execute the instructions 164 to validate the first viewpoint 194 in response to a determination that the first viewpoint 194 is similar to the second viewpoint 195. For example, a news post on a social media may contain a video of a political leader and text and may thus be used to validate the first viewpoint 194. The processor 110 may validate the social media post based on whether the viewpoints expressed in the video and the textual description match. The video and the textual description in this example represent the first media file 125 and the second media file 127. In an example, the processor 110 may additionally determine whether the video has been doctored or altered as discussed above with reference to FIG. 1 and FIG. 2, before validating the first viewpoint 194.

The processor 110 may execute the instructions 166 to generate viewpoint evidence 155. The viewpoint evidence 155 may include the details of the entity 192 and the first media file 125 where the entity 192 expressed the first viewpoint 194. The viewpoint evidence 155 may also include the first viewpoint.

The processor 110 may determine whether the entity 192 expresses a viewpoint dissimilar to the first viewpoint 194 in a subsequently published media file. The processor 110 may determine whether the entity 192 expresses a viewpoint that is dissimilar to the viewpoint evidence in a subsequent media file 128 such as a subsequently published media file. The processor 110 may execute instructions to display the viewpoint evidence 155 in response to the first viewpoint 194 being determined to be dissimilar from the second viewpoint 195. The processor 110 may also send a message when the first viewpoint 194 is determined to be dissimilar from the second viewpoint 195 with a link to the viewpoint evidence 155.

The processor 110 may use the viewpoint evidence 155 to create the index 108. In addition or in other examples, the processor 110 may display the viewpoint evidence 155 when an altered media file is detected, or a media file that is not validated expresses a viewpoint that is dissimilar to the viewpoint that the entity 192 allegedly expressed. Thus, the processor 110 may identify fake news and allow for quick validation of the viewpoints and serve to validate media file.

Figure 5:
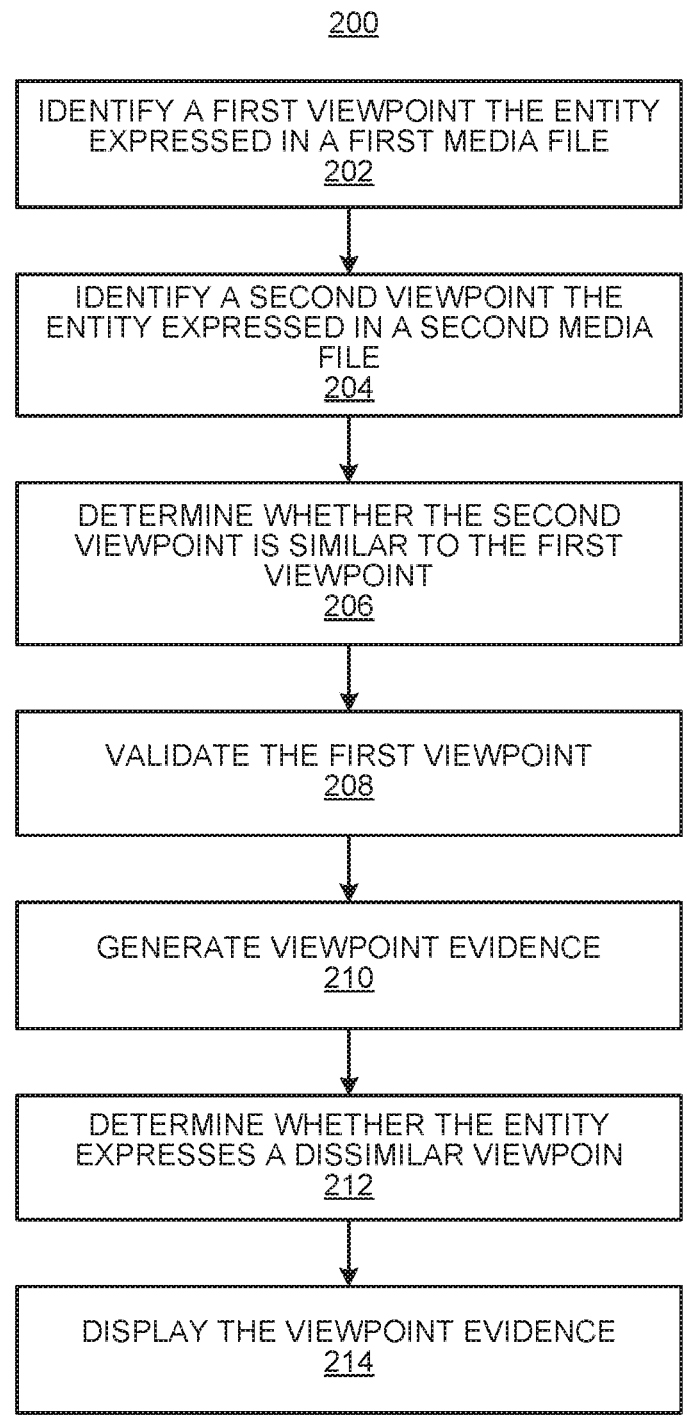
FIG. 5 illustrates a flow chart of an example method of generating a viewpoint evidence.

FIG. 5 shows an example method 200 of generating viewpoint evidence. The processor 110 may execute the method 200 and other methods described herein. For example, the processor 110 shown in FIGS. 1, 2, and 4 may execute the machine readable instructions 124 to execute the method 200. Although particular reference is made herein to the processor 110 executing the method 200, another device or multiple devices may execute the method 200 without departing from the scope of the method 200.

At block 202, the processor 110 may identify a first viewpoint 194 that the entity 192 expressed in a first media file 125. For example, as described above with reference to FIG. 4, the processor 110 may identify the first viewpoint 194 expressed in the first media file 125. At block 204, the processor 110 may identify a second viewpoint 195 expressed in a second media file 125 that is attributed to the entity 192. As noted above, attribution to an entity 192 to a viewpoint may not be an actual indication that the entity 192 expressed that viewpoint. The processor 110 may, as described above with reference to FIG. 1, identify an entity 192 in the media files 125, 127, identify a plurality of features 158 in the media files 125,127, and identify the viewpoints 194,195.

At block 206, the processor 110 may determine whether the first viewpoint 194 is similar to the second viewpoint 195. For example, a news publisher may publish a video and a news article attributing viewpoints 194 to an entity 192.

At block 208, the processor 110 may validate the first viewpoint 194 in response to a determination that the first viewpoint 194 is similar to the second viewpoint 195. For example, the processor 110 may, as described above with reference to FIG. 4, validate the first viewpoint 194 in a first media file 125 such as a textual description based on the second viewpoint 195 expressed in the second media file 127 such as a video. In an example, the processor 110 may validate the authenticity of the first media file 125 and/or the second media file 127 as described above with reference to FIG. 1 and FIG. 2 based on a variation a value of a feature in the media file 125/127.

At block 210, the processor 110 may generate a viewpoint evidence 155. The viewpoint evidence 155 may include an identification of the entity 192 expressing the first viewpoint 194, the first media file 125 or a link to the first media file 125, and the first viewpoint 194. The viewpoint evidence 155 may be generated when the entity 192 expresses a viewpoint for the first time. In another example, the viewpoint evidence 155 may be generated when the entity 192 changes or expresses a viewpoint that is dissimilar to the viewpoint expressed in a previously published media file in the data repository 175 or in a viewpoint evidence 155.

At block 212, the processor 110 may determine whether the entity 192 expresses a viewpoint that is dissimilar to the viewpoint evidence 155 in a media file such as a subsequently published media file. At block 214, the processor 110 may display the viewpoint evidence 155 in response to a determination that the entity expressed a viewpoint that is dissimilar to the viewpoint evidence.

Although the examples herein use k-means, k-NN, CNN, RNN and SVN, other machine learning models and methods may be used such as deep learning classifiers, reinforcement learning, semi-supervised learning, cluster analysis, hierarchical clustering, association rule learning, artificial neural network, unsupervised learning, linear classifier, decision tree and Bayesian analysis.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a non-transitory computer readable medium storing machine readable instructions that when executed by the processor cause the processor to:
identify a first viewpoint expressed by a first person or organization in a first media file based on a first feature written about the first person or organization in the first media file;
identify a second viewpoint expressed by the first person or organization in a second media file based on a second feature written about the first person or organization in the second media file;
determine that the second viewpoint expressed by the first person or organization in the second media file is dissimilar to the first viewpoint expressed by the first person or organization in the first media file by determining that a distance between the second feature in the second media file and the first feature in the first media file, based on a nearest-neighbors machine learning algorithm, is greater than a threshold;
in response to the determination that the second viewpoint expressed by the first person or organization in the second media file is dissimilar to the first viewpoint expressed by the first person or organization in the first media file, output a message containing a viewpoint evidence including the first viewpoint expressed by the first person or organization in the first media file;
identify a topic class in a set of topic classes associated with the first media file;
identify the first viewpoint as a viewpoint in the identified topic class;
determine a topic cloud of the set of topic classes in a data repository;
determine a viewpoint cloud for the topic class associated with the first media file; and
display the determined viewpoint cloud.

2. The apparatus of claim 1, wherein the machine readable instructions further cause the processor to:
determine that the first media file belongs to a subset of media files associated with the first person or organization;
identify that the first person or organization is associated with the first media file in response to the determination that the first media file belongs to the subset of media files;
identify a plurality of features in each of a plurality of media files in the data repository; and
determine the set of topic classes in the plurality of media files in the data repository based on the identified plurality of features.

3. The apparatus of claim 2, wherein the machine readable instructions further cause the processor to:
cause the message to be displayed with a display of the second media tile, wherein the message is displayed with a chronological sequence of the first and second viewpoints that the first person or organization expressed in the first and second media files.

4. The apparatus of claim 1, wherein the machine readable instructions further cause the processor to:
determine a chronological sequence of viewpoints that the first person or organization expressed in a plurality of media files stored in the data repository;
determine a chronological sequence of the first viewpoint and the second viewpoint; and
output the chronological sequence of viewpoints the first person or organization expressed including the first viewpoint and the second viewpoint.

5. The apparatus ofclart 1, herein the machine readable instructions further cause the processor to:
output the message to a mobile device.

6. The apparatus of claim 1, wherein the first viewpoint in the first media file is expressed by the first person, and wherein the machine readable instructions further cause the processor to:
determine that a plurality of facial features of the first person in the first media file are similar to a set of reference facial features stored in the data repository;
identify an identification of the first person stored in the data repository corresponding to the set of reference facial features; and
generate the identification of the first person who expressed the first viewpoint.

7. The apparatus of claim 1, wherein the first viewpoint in the first media file is expressed by the first person, and wherein the machine readable instructions further cause the processor to:
determine that a plurality of acoustic features of the first person in the first media file are similar to a set of reference acoustic features stored in the data repository;
identify an identification of the first person stored in the data repository corresponding to the set of reference acoustic features; and
generate the identification of the first person who expressed the first viewpoint.

8. The apparatus of claim 1, wherein the machine readable instructions further cause the processor to:
identify a third viewpoint expressed by the first person or organization in a third media file that refers to the first media file;
determine whether the third viewpoint is similar to the first viewpoint expressed by the first person or organization; and validate the first viewpoint in response to a determination that the third viewpoint is similar to the first viewpoint expressed by the first person or organization.

9. The apparatus of claim 1, wherein the machine readable instructions further cause the processor to:
determine that a codec of the first media file varies within the first media file, wherein the first media file is a video file;
in response to a determination that the codec of the first media file varies within the first media file, determine that the first media file is altered; and
invalidate an association between the first viewpoint expressed in the first media file and the first person or organization.

10. The apparatus of claim 1, wherein the machine readable instructions further cause the processor to:
determine a value of the first feature in the first media file;
determine a variation in the value of the first feature in the first media file over time;
determine that the determined variation in the value of the first feature exceeds a variation threshold; and
in response to the determination that the determined variation in the value of the first feature exceeds the variation threshold, invalidate an association between the first viewpoint expressed in the first media file and the first person or organization.

11. The apparatus of claim 10, wherein the first feature in the first media file is at least one of a voice pitch of an audio track of the first media file or an intonation change of an audio track of the first media file.

12. The apparatus of claim 1, wherein the machine readable instructions further cause the processor to:
determine that the first feature varies within the first media file, wherein the first feature is a visual aspect of the first media file;
in response to the determination that the first feature varies within the first media file, determine that the first media file is altered; and
invalidate an association between the first viewpoint expressed in the first media file and the first person or organization.

13. The apparatus of claim 1, wherein the machine readable instructions further cause the processor to:
output the second media file to be displayed on a display; and
output the message to be displayed with the second media file on the display.

14. A non-transitory computer readable medium storing machine readable instructions that when executed by a processor cause the processor to:
identify a first person associated with a subset of media files stored in a data repository;
identify a first viewpoint expressed by the first person in a first media file of the subset of media files based on a first feature written about the first person in the first media file;
identify a second viewpoint expressed by the first person in a second media file of the subset of media files based on a second feature written about the first person in the second media file;
determine that the second viewpoint expressed by the first person in the second media file is dissimilar to the first viewpoint expressed by the first person in the first media file by determining that a distance between the second feature in the second media file and the first feature in the first media file, based on a nearest-neighbors machine learning algorithm, is greater than a threshold;
in response to the determination that the second viewpoint expressed by the first person in the second media file is dissimilar to the first viewpoint expressed by the first person in the first media file, output a message containing a viewpoint evidence including the first viewpoint expressed by the first person in the first media file;
identify a topic class in a set of topic classes associated with the first media file;
identify the first viewpoint as a viewpoint in the identified topic class;
determine a topic cloud of the set of topic classes in the data repository;
determine a viewpoint cloud for the topic class associated with the first media file; and
display the determined viewpoint cloud.

15. The non-transitory computer readable medium of claim 14, wherein the machine readable instructions further cause the processor to:
identify a plurality of features in the subset of media files stored in the data repository;
determine the set of topic classes based on the identified plurality of features;
identify a viewpoint that the first person expressed in each media file of the subset of media files and is in the topic class of the set of topic classes;
generate an index that associates the first person with the identified viewpoint and the respective media file in which the identified viewpoint is expressed;
receive a first query; and
identify a media file of the subset of media files stored in the data repository that matches the first query using information contained in the index.

16. The non-transitory computer readable medium of claim 15, wherein the machine readable instructions further cause the processor to:
receive a second query for the first viewpoint; and
identify the first person that expressed the first viewpoint in the second query in another media file of the subset of media files stored in the data repository using information contained in the index.

17. A processor-implemented method comprising:
identifying, by the processor, a first viewpoint expressed by a first person or organization in a first media file stored in a data repository based on a first feature written about the first person or organization in the first media file;
identifying a second viewpoint expressed by the first person or organization in a second media file based on a second feature written about the first person or organization in the second media file;
determining that the second viewpoint expressed by the first person or organization in the second media file is similar to the first viewpoint expressed by the first person or organization in the first media file by determining that a distance between the second feature in the second media file and the first feature in the first media file, based on a nearest-neighbors machine learning algorithm, is less than a threshold;
in response to the determination that the second viewpoint expressed by the first person or organization in the second media file is similar to the first viewpoint expressed by the first person or organization in the first media file, validating, by the processor, the first viewpoint;

generating, based on the first viewpoint being validated, a viewpoint evidence including an identification of the first person or organization, the first viewpoint, and the first media file in which the first person or organization expressed the first viewpoint;

identifying a topic class in a set of topic classes associated with the first media file;

identifying the first viewpoint as a viewpoint in the identified topic class;

determining a topic cloud of the set of topic classes in the data repository;

determining a viewpoint cloud for the topic class associated with the first media file; and displaying the determined viewpoint cloud.

18. The method of claim 17, further comprising:

determining that the first person or organization expressed a third viewpoint that is dissimilar to the viewpoint evidence associated with the first media tile; and causing, for displaying, the viewpoint evidence in response to the determination that the first person or organization expressed the third viewpoint that is dissimilar to the viewpoint evidence associated with the first media file.

19. The method of claim 17, further comprising:

determining that the second viewpoint expressed by the first person or organization is dissimilar to the first viewpoint expressed by the first person or organization; and invalidating the first viewpoint in response to the determination that the second viewpoint expressed by the first person or organization is dissimilar to the first viewpoint expressed by the first person or organization.

* * * * *